United States Patent
Gilbert et al.

(10) Patent No.: US 9,474,047 B2
(45) Date of Patent: Oct. 18, 2016

(54) APPARATUS AND METHOD FOR DYNAMICALLY SELECTING UNICAST OR BROADCAST RESOURCES FOR A PUSH-TO-TALK CALL

(71) Applicant: MOTOROLA SOLUTIONS, INC, Schaumburg, IL (US)

(72) Inventors: Stephen S. Gilbert, Lake Zurich, IL (US); Michelle M. Antonelli, Barrington, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 463 days.

(21) Appl. No.: 14/078,626

(22) Filed: Nov. 13, 2013

(65) Prior Publication Data

US 2015/0131510 A1    May 14, 2015

(51) Int. Cl.
H04H 20/71    (2008.01)
H04W 72/00    (2009.01)
H04W 4/10    (2009.01)
H04W 4/06    (2009.01)

(52) U.S. Cl.
CPC ............. *H04W 72/005* (2013.01); *H04W 4/06* (2013.01); *H04W 4/10* (2013.01)

(58) Field of Classification Search
CPC ......... H04W 4/06–4/08; H04W 4/10; H04W 76/002; H04W 72/005; H04W 8/186; H04W 76/005; H04L 67/1044; H04L 65/4061
See application file for complete search history.

(56) References Cited

U.S. PATENT DOCUMENTS

| | | |
|---|---|---|
| 8,412,829 B2 | 4/2013 | Keller et al. |
| 2005/0281209 A1 | 12/2005 | Cai et al. |
| 2010/0165902 A1 | 7/2010 | Kvernvik et al. |
| 2010/0197265 A1 | 8/2010 | Dorenbosch et al. |
| 2010/0248742 A1 | 9/2010 | Song et al. |
| 2011/0176452 A1 | 7/2011 | Ishibashi |
| 2012/0033623 A1 | 2/2012 | Chu et al. |
| 2012/0170502 A1 | 7/2012 | Korus et al. |
| 2012/0172028 A1* | 7/2012 | Korus ................... H04W 60/00 455/422.1 |
| 2012/0172031 A1 | 7/2012 | Marocchi et al. |
| 2012/0236774 A1* | 9/2012 | Guey ................... H04W 28/16 370/312 |
| 2013/0107773 A1 | 5/2013 | Chang |
| 2013/0194999 A1* | 8/2013 | Anchan ............... H04W 76/002 370/312 |

FOREIGN PATENT DOCUMENTS

| | | |
|---|---|---|
| EP | 2 482 513 A1 | 8/2012 |
| WO | 2012092250 A1 | 7/2012 |
| WO | 2013096032 A1 | 6/2013 |

OTHER PUBLICATIONS

PCT International Search Report Dated Jan. 30, 2015 for Counterpart Application PCT/US2014/061886.

* cited by examiner

*Primary Examiner* — Yemane Mesfin
*Assistant Examiner* — Abdelillah Elmejjarmi (57) ABSTRACT

A controller receives a new resource request from a user equipment associated with a first talk group. The new resource request is a request for an assignment of one of MBMS resources and unicast resources for user equipment associated with the first talk group. The controller identifies a second geographical area in which members of the first talk group are located, determines that MBMS resources are available in the second geographical area, and determines whether the first talk group is an MBMS eligible talk group in the second geographical area. In response to determining that the first talk group is an MBMS eligible talk group in the second geographical area, the controller assigns MBMS resources to the first talk group; otherwise, the controller assigns unicast resources to the first talk group.

19 Claims, 6 Drawing Sheets

APPARATUS AND METHOD FOR DYNAMICALLY SELECTING UNICAST OR BROADCAST RESOURCES FOR A PUSH-TO-TALK CALL

BACKGROUND OF THE INVENTION

Broadband communications networks, such as those operating in accordance with the Long Term Evolution (LTE) signaling standard, may consist of many cells, each of which may support unicast and Multimedia Broadcast Multicast Service (MBMS) bearers. MBMS bearers provide transport features for broadcast (i.e., sending the same information to all users in a cell) or multicast (i.e., sending the same information to a given set of users in a cell) using a subset of the available radio resources. Multiple cells may be grouped together into one or more Multimedia Broadcast Multicast Service Single Frequency Network (MBSFN) regions to provide a transmission mode which synchronizes and simulcasts transmissions in order to multicast or broadcast data as a multi-cell transmission and thereby reach multiple user equipment in multiple cells with a single transmission.

Users on broadband systems may communicate via mobile terminals (also referred to herein as mobile devices or user equipment), for example, laptops, tablets, personal digital assistants (PDA), smart phones, or other similar mobile devices that communicate with one another via wired and/or wireless networks. A mobile device may be subscribed to a push-to-talk service such that the mobile device may be dynamically, semi-permanently, or permanently configured to be a member of or affiliated with a group (also referred to herein as a talk group), where a single device in the group may transmit information that is substantially simultaneously received by other members of the talk group. For push-to-talk service, uplink bearers are unicast and downlink bearers may be unicast, MBMS broadcast or MBMS multicast, or a combination, depending on the network and user equipment capabilities. While push-to-talk service is possible in a unicast-only network, MBMS is considered necessary to provide full mission critical performance and scalability. MBMS bearers for push-to-talk service are semi-permanently established (i.e., the MBMS bearers are established and the number of bearers may be updated periodically). The established MBMS bearers are placed in a resource pool, and shared (trunked) across the various push-to-talk groups as needed. Thereafter, radio resources (i.e., unicast or MBMS bearers) may be assigned dynamically to each push-to-talk group as the group becomes active.

Accordingly, there is a need for an apparatus and method for dynamically selecting the most appropriate unicast or MBMS resources for a push-to-talk group.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to methods and apparatuses for assigning Multimedia Broadcast Multicast Service (MBMS) resources. A list of MBMS eligible talk groups in a first geographical area is maintained. A controller receives a new resource request from a user equipment associated with a first talk group. The new resource request is a request for an assignment of one of MBMS resources and unicast resources for user equipment associated with the first talk group. The controller identifies a second geographical area in which members of the first talk group are located, determines that MBMS resources are available in the second geographical area, and determines whether the first talk group is an MBMS eligible talk group in the second geographical area. In response to determining that the first talk group is an MBMS eligible talk group in the second geographical area, the controller assigns MBMS resources to the first talk group; otherwise, the controller assigns unicast resources to the first talk group.

Figure 1:
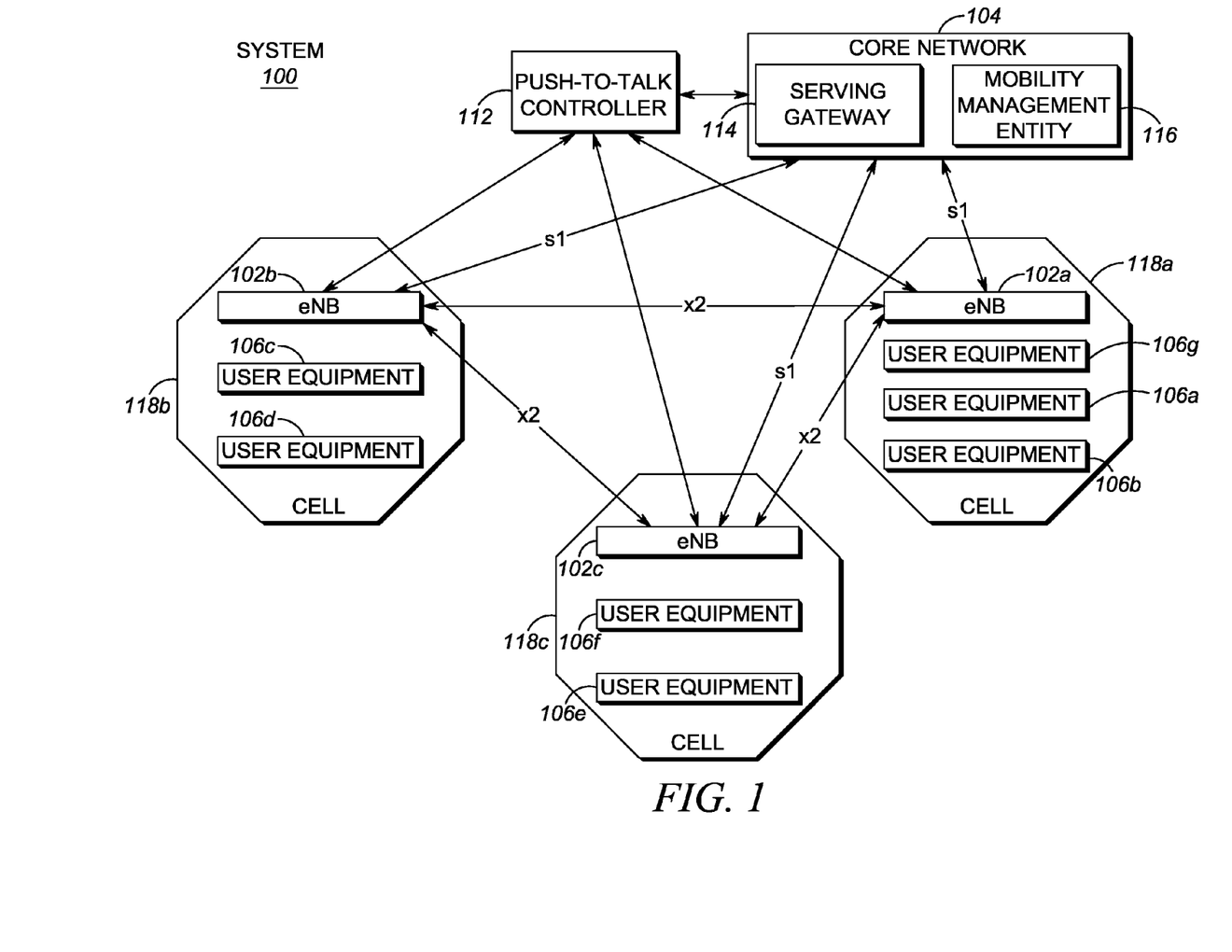
FIG. 1 is a block diagram a broadband system used in accordance with some embodiments.

FIG. 1 is a block diagram of a broadband system used in accordance with some embodiments. System 100 illustrates elements of a Long Term Evolution (LTE) system, although any broadband system may be used. System 100 includes multiple evolved Node Bs (eNBs) 102 (i.e., eNBs 102a, 102b, and 102c), each of which communicates directly with a core network 104 via an S1 interface and with one or more user equipment 106 (i.e., user equipment 106a-106g also referred to as mobile terminals or mobile devices), such as mobile phones, tablets or laptops. Core network 104 includes a serving gateway 114 and a mobility management entity 116. Serving gateway 114 routes incoming and outgoing internet protocol (IP) packets and handles handover between eNBs 102. Mobility management entity 116 handles signaling related to mobility and security.

Each eNB 102 provides coverage to one or more cells and manages radio resources in a corresponding one or more cell. Therefore, user equipment 106 in a cell sends information to and receives information from the core network 104 through the eNB 102 in the cell in which the user equipment operates. eNBs 102 may be connected to each other in a meshed fashion, i.e., eNBs 102 may possibly be linked together, e.g., via an x2 interface, to minimize packet loss due to user equipment 106 movements. As, for example, user equipment 106a moves across the network and disconnects from eNB 102a and connects to eNB 102b, unsent or unacknowledged packets stored in a queue in eNB 102a may be forwarded or tunneled to eNB 102b via an x2 interface that connects eNBs 102a and eNB 102b.

Each user equipment 106 may be subscribed to a push-to-talk service such that the user equipment is a member of or is affiliated with at least one talk group. For push-to-talk service, uplink bearers are unicast and downlink bearers may be unicast, Multimedia Broadcast Multicast Service (MBMS) broadcast, MBMS multicast, or a combination thereof, depending on the network and user equipment capabilities. MBMS resources may be pre-established prior to those resources being invoked by user equipment 106 associated with the push-to-talk-service. Cells may be grouped together into one or more Multimedia Broadcast Multicast Service Single Frequency Networks (MBSFN) to provide a transmission mode that synchronizes and simulcasts multi-cell multicast and broadcast transmissions. This makes the MBSFN transmission appear to user equipment 106 as a transmission from a single large cell. The MBSFN regions used by a single talk group may be "non-overlapping" (i.e., a particular LTE cell may be assigned to at most one MBSFN that the user equipment can use to receive the push-to-talk group transmissions.) In this embodiment, user equipment 106 affiliated with a talk group would receive at most a single MBSFN transmission for that talk group at a time. If two MBSFN regions overlap, then the user equipment could use the region which provides it with the better signal quality and the resulting resource assignment problem would be addressed the same as in the case of non-overlapping MBSFN regions.

A push-to-talk controller 112 includes a resource management component configured to assign unicast or pre-existing MBMS resources in a network (also referred to as a first geographical area). Push-to-talk controller 112 assigns unicast or pre-existing MBMS resources to a call affiliated with a talk group in a particular MBSFN (also referred to as a second geographical area) or in a group of cells. To efficiently use radio resources, push-to-talk controller 112 dynamically assigns pre-established MBMS bearers in a particular MBSFN or group of cells to a push-to-talk call affiliated with a talk group as the call becomes active, or instead establishes unicast bearers for use by the user equipment 106 in that talk group. A talk group may become active when a member of that talk group presses a push-to-talk (PTT) button on a user equipment 106 and generates a transmission to be heard by the talk group. Push-to-talk controller 112, upon detecting that a user equipment PTT button has been pressed, may make the entire talk group active by distributing the audio to all of the user equipment 106 of the talk group who are also then considered active.

In assigning pre-established MBMS bearers in a particular MBSFN or group of cells, push-to-talk controller 112 may take into consideration, for example, the current user equipment locations (i.e., the MBSFN or cell location of each user equipment), the talk group priority, and/or other network resource utilization data. When on-demand real-time group multimedia service is invoked, for each geographical area where a user equipment 106 associated with a talk group being activated is located, push-to-talk controller 112 may use available information to dynamically decide if unicast or pre-established MBMS service should be used by the talk group.

The push-to-talk controller 112 may assign MBMS resources if those resources are available in a geographical area (for example, an MBSFN and/or a cell) and if the use of the MBMS resources by a particular talk group is not likely to prevent the use of those MBMS resources by another talk group that push-to-talk controller 112 determines to be more appropriate to use the MBMS resources within a predefined future period. To determine if the MBMS resource assignment would likely prevent a more appropriate talk group from using the assigned MBMS resources, for example, for each MBSFN or group of cells associated with a talk group, push-to-talk controller 112 may maintain a list of MBMS-eligible talk groups. Those talk groups in the MBMS-eligible list are talk groups that are designated by push-to-talk controller 112 as being currently eligible to use MBMS resources in the geographical areas. Although preemption may introduce the risk of temporarily interrupting the audio when users listening on an active call are switched from MBMS to unicast, in one embodiment, push-to-talk controller 112 may pre-empt existing push-to-talk calls to free up MBMS resources if none are available.

When generating the MBMS-eligible talk group list, if only the MBSFN identity (ID) (and not the cell ID) in which the user equipment is located is known for those user equipment in, for example, a first talk group, the push-to-talk controller 112 may consider the size (i.e., the number of members) of each talk group within the MBSFN(s) associated with the first talk group. In particular, push-to-talk controller 112 may consider which talk groups in each MBSFN associated with the first talk group have MBMS-capable user equipment and identify the number of MBMS-capable user equipment in each talk group in each of those MBSFNs. For each MBMS-capable user equipment determined to be in a talk group in an MBSFN, the push-to-talk controller 112 may increase the talk group size count in that MBSFN, for example, by adding one to the talk group's size count in that MBSFN. If the number of members in the talk group in that MBSFN is less than a member threshold, "L", the talk group may be determined to be ineligible for MBMS resources. L is the member threshold number of users on a call who are within a single MBSFN, below which member threshold MBMS is likely to be less efficient than unicast. Accordingly, for any talk group with less than L MBMS-capable user equipment in the MBSFN, push-to-talk controller 112 may determine that unicast is likely to be more efficient than MBMS in that MBSFN. It should be noted that the values of L may differ such that the value of L in a first MBSFN may be different from the L value in a second MBSFN.

Of those talk groups with L or more than L MBMS-capable user equipment in the MBSFN, push-to-talk controller 112 determines which talk groups have a user equipment that has been active within a recent time period; for example, within the last T minutes. Activity may include, for example, sending push-to-talk requests. T represents the length of time push-to-talk controller 112 is to wait before considering a group to be idle and unlikely to become active within a predefined future time period. This is based on the assumption that recently active groups are the most likely to be active within a predefined upcoming time period. The value associated with T may vary based on how the system is deployed. Of those talk groups with L or more than L MBMS-capable user equipment in the MBSFN and with user equipment that have been active within the T time period, those talk groups which have the largest number of users within the MBSFN may be determined to be eligible to use MBMS resources in the MBSFN and their identities may be stored, by push-to-talk controller 112, on an "MBMS-eligible" list. A separate MBMS-eligible list may be maintained for each MBSFN.

The number of talk groups which are allowed to be simultaneously on the MBMS-eligible list may be limited by an MBMS-eligible threshold value, "A", where the A largest talk groups which are considered eligible based on the previously stated criteria are allowed to remain on the list, and a set of smaller talk groups otherwise considered eligible by the previously stated criteria, but which would cause the size of the list to exceed the size limit A, would be eliminated from the MBMS-eligible list. A may be calculated as the product of an "overbooking" factor, "B", multiplied by the number of MBMS channels, "C", which exist in that MBSFN region. For example, a single MBMS channel is assumed to be capable of carrying one PTT voice call at a given time. B is used to avoid allocating more MBMS channel capacity to the PTT service than is needed. If a network is designed to carry a certain amount of traffic at peak periods, then some resources may likely be unused during non-peak times. Therefore, B is the average number of groups that can share a channel. It should be noted that different values may be assigned to L, A, C, B and T in each MBSFN associated with the first talk group because the number of cells, geographic area covered, and pattern of offered traffic may be different in each MBSFN.

While MBMS is appropriate for providing push-to-talk service to large groups, MBMS is particularly important for providing services to densely located talk groups (i.e., talk groups where a large number of user equipment are in the same cell). If densely populated talk groups use unicast resources for push-to-talk service, this could potentially overload the cell, even if the overall size of a particular talk group could be carried easily if distributed amongst more cells. Therefore, to account for those densely populated cells where using MBMS would be more beneficial, available cell location information may be used. In particular, to reduce the incidence of cell overload, when a large number of members of a talk group are in a cell, the count of the number of members of that talk group within the MBSFN may be increased at a rate of more than one increment per talk group member in the cell. This is in comparison to increasing the count by just the number of talk group members in the cell when there are a small number of members of the talk group in the cell. Using this approach, the total count for a talk group with a large number of members no longer represents the actual number of members of the talk group in the MBSFN, but the total count is adjusted so that dense talk groups are more likely to be allocated MBMS resources. More specifically in this approach, each talk group is considered in turn, and within each talk group, each cell within the MBSFN is considered in turn.

In an embodiment, if the number of user equipment in the talk group in the cell is less than or equal to a density threshold, E, then the weighted count, W, for the talk group in that cell is equal to the number of members of the talk group in that cell. On the other hand, if the number of members of the talk group in the cell is greater than E, then W is calculated, for example by taking the difference of the number of members of the talk group in the cell minus E, multiplying the difference by a density weighting factor, and adding the product to E. The density weighting factor may be a constant (for example, 1.25) or a variable (for example, 1.2 for the first user equipment beyond E, 1.4 for the second user equipment beyond E, 1.6 for the third, user equipment beyond E, and so on). Considering each talk group in turn, W is calculated for each cell and the sum of W for all cells in the MBSFN is calculated. If the sum of W is less than L for a talk group in the MBSFN, then that talk group may be considered to not be eligible for MBMS resources in the MBSFN. Of those groups where the sum of W in the MBSFN is greater than or equal to L and where at least one user equipment has been active in the last T minutes, the largest of those groups may be determined to be eligible to use MBMS resources in the MBSFN and placed on an MBMS-eligible list for that MBSFN. The number of talk groups which are allowed to be simultaneously on this list in the MBSFN may be limited to the value "A". Those not on the lists are considered ineligible for MBMS resource.

A priority value may be assigned to each talk group. The priority value may affect the talk group eligibility for MBMS resources. For example, the priority value may be multiplied by the number of members in the talk group in an MBSFN when ordering the list of talk groups in order of decreasing or increasing eligibility to use MBMS resources in the MBSFN. In this approach, the total count for a talk group in the MBSFN no longer indicates the actual number of users of the talk group in the MBSFN, but is adjusted so that a talk group with a higher priority would be more likely to be assigned MBMS resources than another group with the same number of affiliated members in the MBSFN region or cell which has a lower priority.

The list of MBMS eligible talk groups in an MBSFN may be initially created responsive to starting up the system. The list may be updated when, for example, a user affiliation event occurs (for example, user equipment in the MBSFN affiliates with or leaves a talk group), a user MBSFN mobility event occurs (for example, user equipment enters or leaves the MBSFN), when an activity list is updated (for example, when a push-to-talk group remains idle longer than the T time period and is removed from a 'recently active' list or when an idle talk group becomes active, for example, by sending a push-to-talk request and therefore is moved to the recently active list). In some embodiment, updating the MBMS-eligible list may not affect already granted calls. The list of MBMS-eligible groups may be dynamically updated in the MBSFN immediately before deciding what type of resource (MBMS or unicast) to allocate to a talk group which is requesting resources.

In some embodiments, instead of creating a list of MBMS eligible talk groups in the MBSFN and determining whether, for example, the first talk group is currently on the MBMS-eligible list in the MBSFN, an estimate may be performed to determine whether or not the first talk group would be on the MBMS-eligible list if such a list is to be created. In these embodiments, the smallest size, S, associated with an MBMS-eligible talk group in the MBSFN is estimated. If the list of MBMS-eligible talk groups for the MBSFN is actually created, this is the size which the smallest talk group on the list is estimated to have. Thereafter, when deciding whether the first talk group should be assigned MBMS resources, the number of members affiliated with the first talk group in the MBSFN is compared to the value of S, and if less than S, the first talk group would not be assigned MBMS resources in the MBSFN. In some embodiments, the list may actually be created occasionally in order to determine the value of S which is based on the value associated with the size of the smallest MBMS-eligible talk group. In this embodiment, the list would not be updated upon each event that could cause it to change, but only occasionally in order to determine a new value of S. In other embodiments, a mathematical calculation may use metrics correlated with S in order to predict a value of S. For example, a linear regression might be performed which predicts the value of S based on the average or median number of members in the talk groups in the MBSFN which have recently had active calls in the MBSFN or in multiple MBSFNs. Additional factors which could be used in the linear regression may include, for example, the average or median push-to-talk rate of all of the talk groups, or of all of the talk groups that have users in the MBSFN, and/or the values of A, L, and/or T as defined above.

Figure 2:
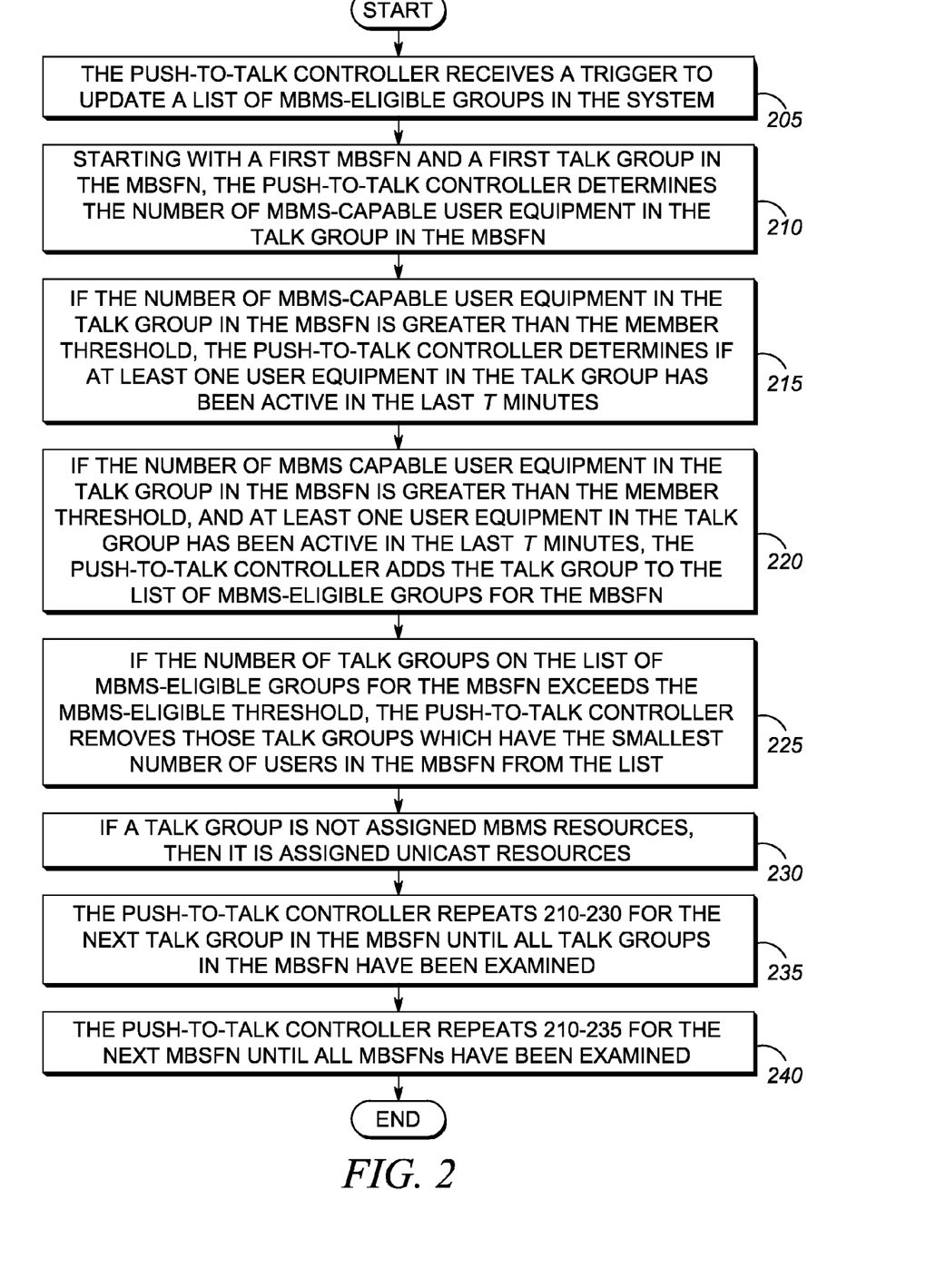
FIG. 2 is a flow diagram for creating a list of MBMS-eligible groups for an MBSFN when no cell location information is available in accordance with some embodiments.

FIG. 2 is a flow diagram for creating, by the push-to-talk controller 112, a list of MBMS-eligible groups for an MBSFN when no cell location information is available in accordance with some embodiments. At 205, the push-to-talk controller receives a trigger to update a list of MBMS-eligible groups in the system. At 210, starting with a first MBSFN and a first talk group in the MBSFN, the push-to-talk controller determines the number of MBMS-capable user equipment in the talk group in the MBSFN. At 215, if the number of MBMS-capable user equipment in the talk group in the MBSFN is greater than the member threshold, the push-to-talk controller determines if at least one user equipment in the talk group has been active in the last T minutes. At 220, if the number of MBMS capable user equipment in the talk group in the MBSFN is greater than the member threshold, and at least one user equipment in the talk group has been active in the last T minutes, the push-to-talk controller adds the talk group to the list of MBMS-eligible groups for the MBSFN. At 225, if the number of talk groups on the list of MBMS-eligible groups for the MBSFN exceeds the MBMS-eligible threshold, the push-to-talk controller removes those talk groups which have the smallest number of users in the MBSFN from the list. At 230, if a talk group is not assigned MBMS resources, then it is assigned unicast resources. At 235, the push-to-talk controller repeats 210-230 for the next talk group in the MBSFN until all talk groups in the MBSFN have been examined. At 240, the push-to-talk controller repeats 210-235 for the next MBSFN until all MBSFNs have been examined.

Figure 3A:
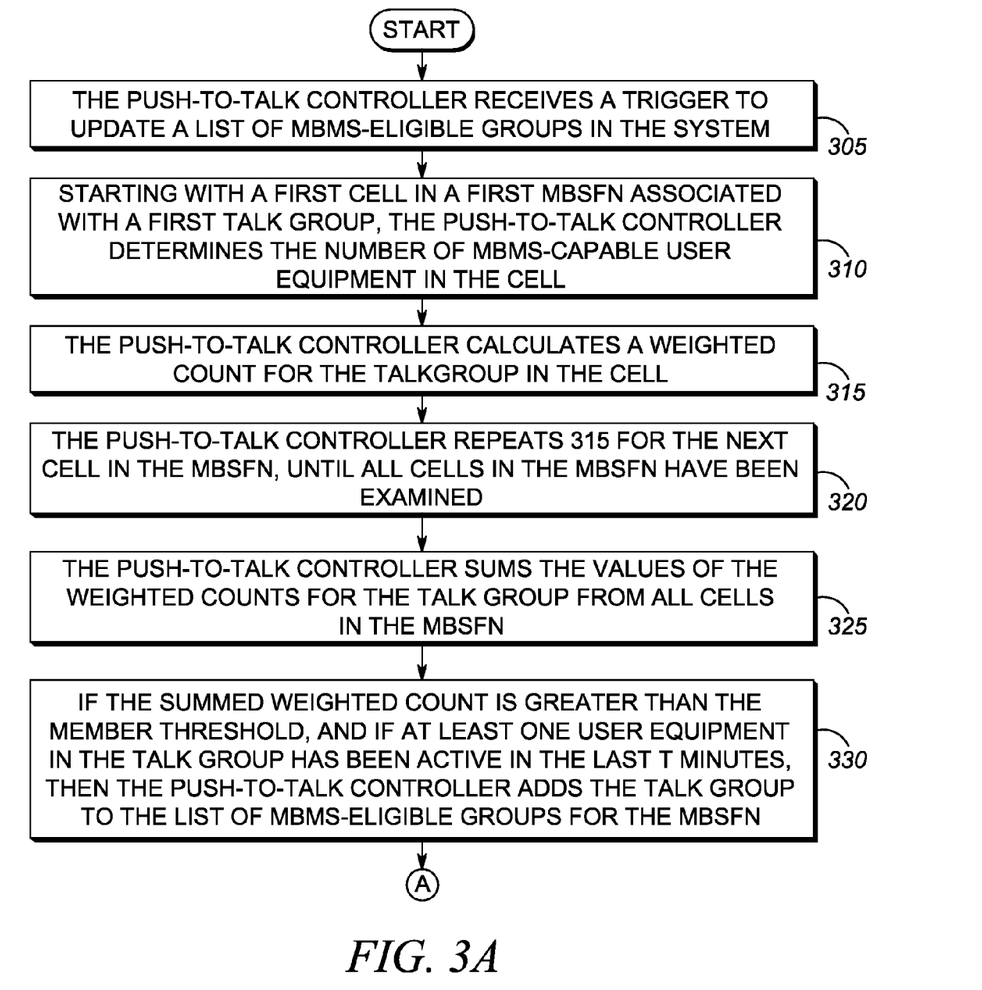
FIG. 3A-3B is a flow diagram for creating a list of MBMS-eligible groups for an MBSFN when cell location information is known for user equipment in accordance with some embodiments.
Figure 3B:
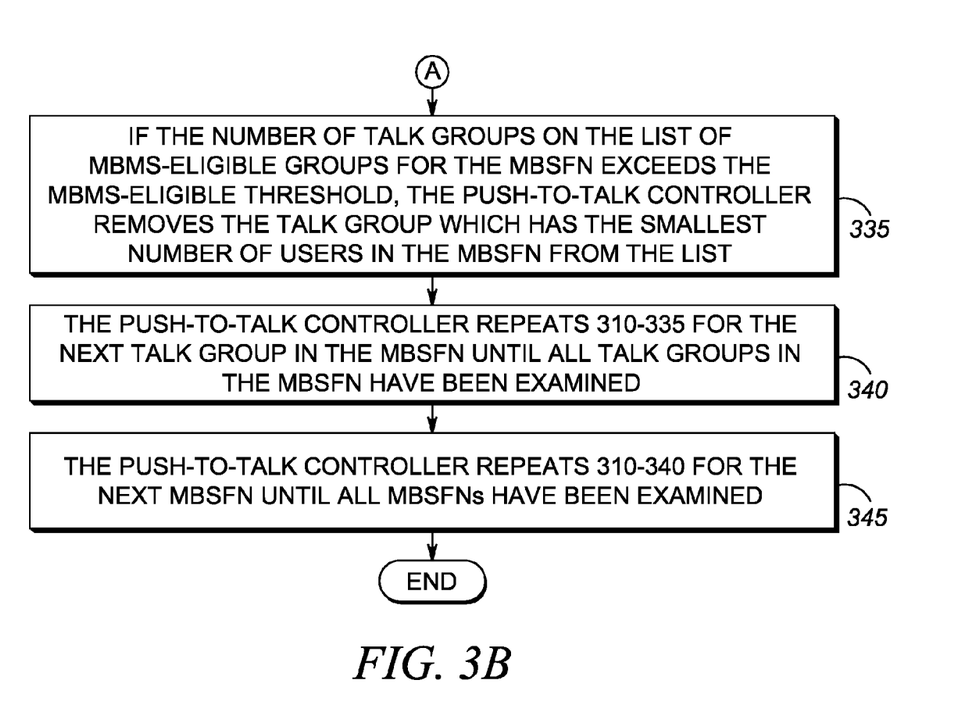

FIG. 3A-3B is a flow diagram for creating, by the push-to-talk controller 112, a list of MBMS-eligible groups for an MBSFN when cell location information is known for user equipment in accordance with some embodiments. At 305, the push-to-talk controller receives a trigger to update a list of MBMS-eligible groups in the system. At 310, starting with a first cell in a first MBSFN associated with a first talk group, the push-to-talk controller determines the number of MBMS-capable user equipment in the cell. At 315, the push-to-talk controller calculates a weighted count for the talk group in the cell. For example, if the number of MBMS-capable user equipment for the talk group in the cell is less than or equal to a density threshold, then a weighted count is equal to the number of MBMS-capable user equipment for the talk group in the cell. However, if the number of MBMS-capable user equipment for the talk group in the cell is greater than the density threshold, then the weighted count is equal to the number of MBMS-capable user equipment for the talk group in the cell minus the density threshold, the difference of which is multiplied by a density weighting factor and the product of which is added to the density threshold. At 320, the push-to-talk controller repeats 315 for the next cell in the MBSFN, until all cells in the MBSFN have been examined. At 325, the push-to-talk controller sums the values of the weighted counts for the talk group from all cells in the MBSFN.

At 330, if the summed weighted count is greater than the member threshold, and if at least one user equipment in the talk group has been active in the last T minutes, then the push-to-talk controller adds the talk group to the list of MBMS-eligible groups for the MBSFN. At 335, if the number of talk groups on the list of MBMS-eligible groups for the MBSFN exceeds the MBMS-eligible threshold, the push-to-talk controller removes the talk group which has the smallest number of users in the MBSFN from the list. At 340, the push-to-talk controller repeats 310-335 for the next talk group in the MBSFN until all talk groups in the MBSFN have been examined. At 345, the push-to-talk controller repeats 310-340 for the next MBSFN until all MBSFNs have been examined.

Figure 4:
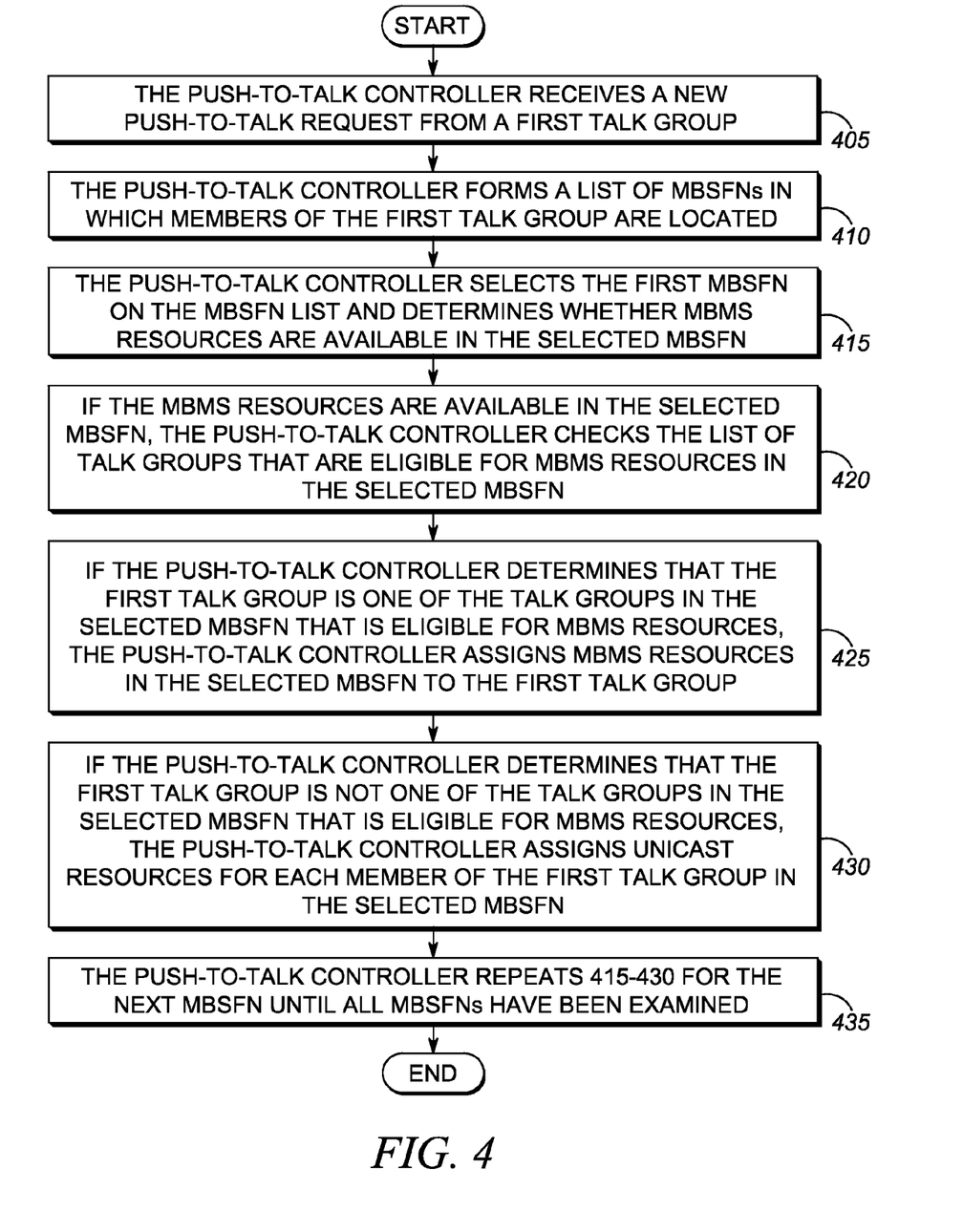
FIG. 4 is a flow diagram of how the push-to-talk controller determines if an MBMS resource is to be assigned to a fast-start push-to-talk group in accordance with some embodiments.

FIG. 4 is a flow diagram of how the push-to-talk controller 112 determines if an MBMS resource is to be assigned to a fast-start push-to-talk group in accordance with some embodiments. This flow diagram may be amended to support, for example, all-start push-to-talk groups or other on demand real-time multimedia group services. At 405, the push-to-talk controller receives a new push-to-talk request from a first talk group. At 410, the push-to-talk controller forms a list of MBSFNs in which members of the first talk group are located. At 415, the push-to-talk controller selects the first MBSFN on the MBSFN list and determines whether MBMS resources are available in the selected MBSFN.

At 420, if the MBMS resources are available in the selected MBSFN, the push-to-talk controller checks the list of talk groups that are eligible for MBMS resources in the selected MBSFN. At 425, if the push-to-talk controller determines that the first talk group is one of the talk groups in the selected MBSFN that is eligible for MBMS resources, the push-to-talk controller assigns MBMS resources in the selected MBSFN to the first talk group. At 430, if the push-to-talk controller determines that the first talk group is not one of the talk groups in the selected MBSFN that is eligible for MBMS resources, the push-to-talk controller assigns unicast resources for each member of the first talk group in the selected MBSFN. If the push-to-talk controller is unable to obtain unicast resources for a member of the first talk group, the push-to-talk controller may place that member into a queue and allocates unicast resources to that member when the unicast resources become available. It should be noted that the unicast resources may be needed in more than one cell. At 435, the push-to-talk controller repeats 415-430 for the next MBSFN until all MBSFNs have been examined.

As an alternative, at 415, the push-to-talk controller determines if fewer than "K" group resource requests are queued for MBMS resources in the selected MBSFN, where the value of K is selected to control expected queuing delay of requests. The value of K associated with an MBSFN may be dynamically changed in order to maintain a desired relationship between the queuing delay that may be experienced by unicast bearer resource requests during congestion, and that may be experienced contemporaneously by MBMS resource requests. At 420, the push-to-talk controller may assign MBMS resources to the first talk group in the selected MBSFN if there are unused MBMS resources immediately available for use by the first talk group. If unused MBMS resources are not immediately available and there are fewer than K existing groups queued awaiting assignment of MBMS resources in the MBSFN then the push-to-talk controller may queue the request for later assignment of MBMS resources.

In creating the list of groups eligible to be assigned broadcast resources within the MBSFN, the push-to-talk controller may consider the time elapsed since a group's most recent activity; a current MBSFN within which each user equipment is located; a priority of each talk group; network resource utilization data, such as the percentage of LTE Guaranteed Bit-Rate (GBR) bearer utilization per cell and/or per MBSFN; the number of users located within the MBSFN and/or cell affiliated with each talk group; a configurable minimum number of members in a group within the MBSFN, below which the group is considered ineligible for use of MBMS resources in that MBSFN; a number of simultaneous group calls using MBMS which is supported in each MBSFN; a configurable number of talk groups which are allowed to simultaneously be on the MBMS-eligible list for a particular MBSFN; and/or information regarding the failure to establish a Unicast GBR bearer for user equipment due to radio frequency (RF) resource congestion. The following are examples of how this information may be used in forming a list of MBMS eligible talk groups within an MBSFN. If the time elapsed since a group's most recent activity exceeds a value T then the group is considered unlikely to become active within a predefined future time period and is determined to not be placed on the list of groups eligible to use MBMS resources in the MBSFN. A user equipment is considered ineligible to use MBMS resources in an MBSFN if it is not located within that MBSFN, and therefore if no user equipment of the group is located in a particular MBSFN the group is not placed in the list of groups eligible to use MBMS resources in that MBSFN. A priority value may be multiplied by the number of members in the talk group in a particular MBSFN when ordering the list of talk groups in order of decreasing or increasing eligibility to use MBMS resources in the MBSFN, which is followed by limiting the size of the list, resulting in the formation of the list groups eligible to use MBMS resources in the particular MBSFN. If the percent of unicast LTE GBR bearer network resource utilization per cell and/or per MBSFN is too high due to excessive use of unicast GBR bearers by PTT voice traffic, the PTT controller may increase the amount of MBMS GBR bearer capacity which the PTT voice service will pre-allocate for its use to decrease the need to use unicast GBR bearers which will result in increasing the number of groups simultaneously allowed on the list of MBMS eligible talk groups for that MBSFN. The number of users located within the MBSFN and/or cell which are affiliated with a particular talk group may be used to determine the benefit obtained from distributing PTT audio to that group via MBMS, and to justify the action of placing the groups with the largest number of users in the MBSFN and/or cell on the MBMS eligible list. A group may be considered ineligible for use of MBMS in a particular MBSFN, and kept off the MBMS eligible list for the MBSFN, if the number of members of the group in the MBSFN is below a configurable minimum value, which would indicate that the group is unlikely to use the MBMS resources more efficiently than other groups. A configurable number of simultaneous group calls using MBMS which is supported in the particular MBSFN may be used by the processor to determine how much MBMS capacity to pre-allocate in the MBSFN and to help determine whether pre-allocated MBMS resources are available for use in the MBSFN, and also to help determine via the possible use of an overbooking value, the number of groups which are simultaneously allowed on the list of MBMS eligible groups for the particular MBSFN. A configurable number of talk groups which are allowed to simultaneously be on the MBMS-eligible list for a particular MBSFN may be used to determine how many talk groups are removed from the list and how many are allowed to remain on the list when the size of the list is limited following the creation of the larger list which may be ordered by talkgroup size in the MBSFN and/or priority. Information regarding the failure to establish a unicast GBR bearer for user equipment due to radio frequency (RF) resource congestion in a cell may be used to identify a particular cell whose unicast GBR resources are congested, and which may further trigger identification of one or more talkgroups which have many users in the congested cell and which should be included in the list of MBMS eligible talk groups in the MBSFN in order to reduce congestion in that cell.

Figure 5:
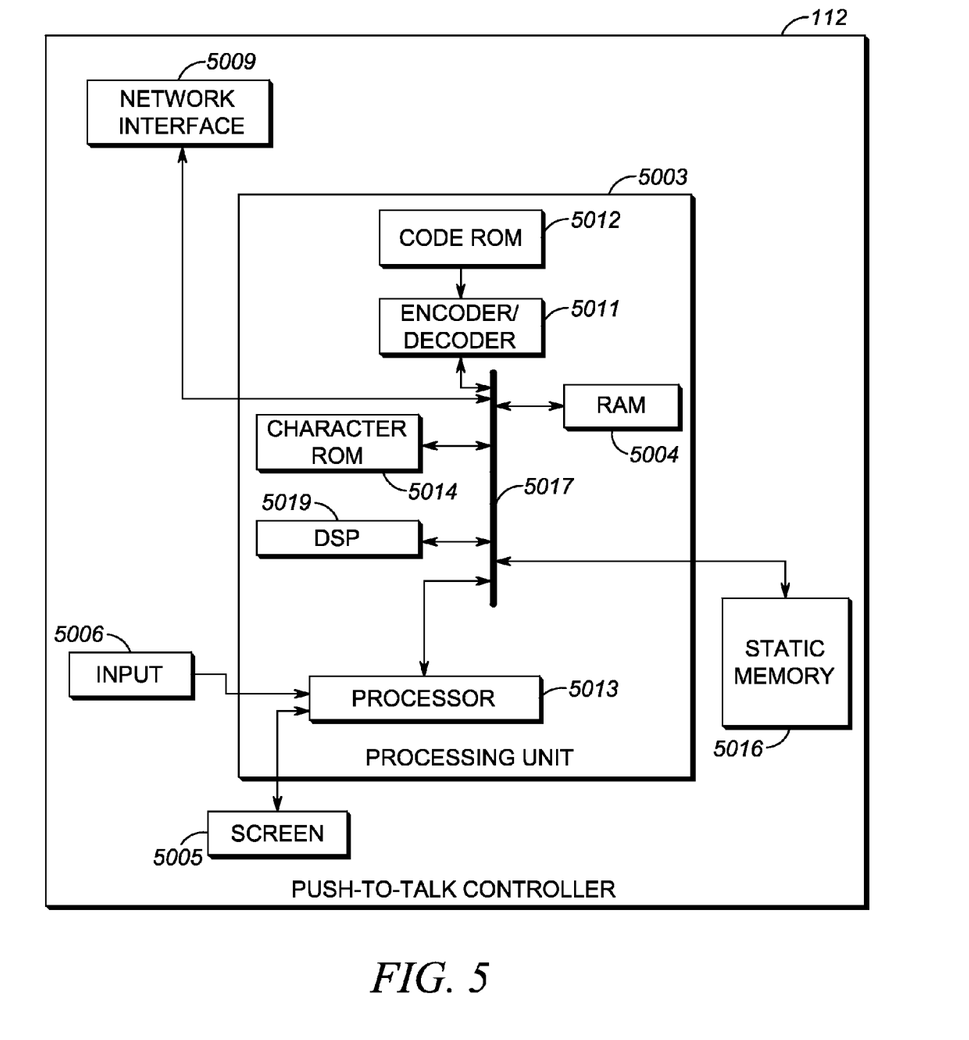
FIG. 5 is a block diagram of a push-to-talk controller used in accordance with some embodiments.

FIG. 5 is a block diagram of the push-to-talk controller 112 in accordance with some embodiments. The push-to-talk controller 112 includes a network interface 5009 coupled to a common data and address bus 5017 of a processing unit 5003. The push-to-talk controller 112 may also include an input unit (e.g., keypad, pointing device, etc.) 5006 and a display screen 5005, each coupled to be in communication with the processing unit 5003.

The processing unit 5003 may include an encoder/decoder 5011 with an associated code ROM 5012 for storing data for encoding and decoding voice, data, control, or other signals that may be transmitted or received by the push-to-talk controller. The processing unit 5003 may further include a processor 5013, such as one or more microprocessors, microcontrollers, digital signal processors (DSPs), customized processors, field programmable gate arrays (FPGAs), or combinations thereof or such other devices known to those having ordinary skill in the art, which processor is configured to execute the functions described herein as being executed by the push-to-talk controller and coupled, by the common data and address bus 5017, to the encoder/decoder 5011, a character ROM 5014, a RAM 5004, and a static memory 5016, which various memory devices maintain data and programs that may be executed by the processor and that allow the push-to-talk controller to perform all functions necessary to operate in communication system 100.

The network interface 5009 configurable to communicate with network components (for example, the eNBs), and other user equipment (for example, subscriber units) within its communication range. The character ROM 5014 stores code for decoding or encoding data such as control, request, or instruction messages, channel change messages, and/or data or voice messages that may be transmitted or received by the controller. Static memory 5016 may store operating code associated with processing a talk group resource requests in accordance with this disclosure, including the steps set forth in FIGS. 2-4.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for assigning Multimedia Broadcast Multicast Service (MBMS) resources comprising:
   accessing, by a controller, a list of MBMS-eligible talk groups in a first geographical areas;
   receiving, by the controller, a new resource request from a user equipment associated with a first talk group, the new resource request being a request for an assignment of one of MBMS resources and unicast resources for user equipment associated with the first talk group;
   identifying, by the controller, a second geographical areas in which members of the first talk group are located;
   determining, by the controller, that MBMS resources are available in the identified second geographical areas;
   determining, by the controller and by reference to the list of MBMS-eligible talk groups, whether the first talk group is an MBMS-eligible talk group in the second geographical areas;
   in response to determining that the first talk group is an MBMS-eligible talk group in the second geographical areas, assigning MBMS resources to the first talk group; and
   in response to determining that the first talk group is not an MBMS-eligible talk group in the second geographical areas, assigning unicast resources to the first talk group;
   further comprising creating the list of MBMS-eligible talk groups, wherein creating comprises, for each of one or more talk groups;
   identifying each talk group having one or more associated user equipment (UE) located within one or more cells of the first geographical areas to produce one or more identified talk groups and, for each identified talk group;
   determining, for the talk group and for each cell, a talk group size, wherein the talk group size is associated with a number of members of the talk group located in the cell;
   when the talk group size is less than a density threshold, assigning the determined talk group size to a weighted count;
   when the talk group size is greater than the density threshold, calculating the weighted count for the talk group;
   summing the weighted counts for all cells in the first geographical areas; and
   adding the talk group to the list of MBMS-eligible talk groups if the sum of the weighted counts for the talk group is greater than a member threshold, one or more UEs in the talk group have been active within a predefined period of time, and limiting the number of talk groups in the list of MBMS-eligible talk groups when the number of talk groups in the list of MBMS-eligible talk groups exceeds an MBMS-eligible threshold.

2. The method of claim 1, wherein the second geographical areas is a Multimedia Broadcast Multicast Service Single Frequency Network (MBSFN).

3. The method of claim 1, further comprising creating the list of MBMS-eligible talk groups, wherein creating comprises, for each of one or more talk groups:
   determining a number of MBMS-capable members of each talk group in each MBSFN in the first geographical areas;
   comparing the number of MBMS-capable members of each talk group in each MBSFN to a member threshold associated with each MBSFN; and
   when the number of MBMS-capable members of a talk group in each MBSFN is less than the member threshold, determining that the talk group is ineligible for MBMS resources.

4. The method of claim 3, wherein creating the list of MBMS-eligible talk groups further comprises, for each of the one or more talk groups:
   when the number of MBMS-capable members of the talk group is greater than or equal to the member threshold, determining whether at least one user equipment affiliated with the talk group had been active within a predefined period of time; and
   adding the talk group to the list of MBMS-eligible talk groups.

5. The method of claim 4, further comprising limiting the number of talk groups in the list of MBMS-eligible talk groups when the number of talk groups in the list of MBMS-eligible talk groups exceeds an MBMS-eligible threshold.

6. The method of claim 5, further comprising:
   associating a priority value with each talk group in the list of MBMS-eligible talk groups; and
   ranking the talk groups in the list of MBMS-eligible talk groups based on at least one of the priority value associated with each talk group and the number of members of the talk group.

7. The method of claim 1, further comprising creating the list of MBMS-eligible talk groups, wherein creating comprises, for each of one or more talk group creating the list of MBMS-eligible talk groups and wherein the list of MBMS-eligible talk groups is updated when one or more of a user affiliation event occurs, a user mobility event occurs, or an activity list is updated.

8. The method of claim 1, wherein assigning the MBMS resources or the unicast resources comprises:
   identifying a talk group in the list of MBMS-eligible talk groups having a smallest number of members;
   comparing a number of members of the first talk group with the number of members of the talk group having the smallest number of members;
   wherein assigning MBMS resources comprises assigning MBMS resources to the first talk group if the number of members of the first talk group is greater than the number of members of the talk group having the smallest number of members; and
   wherein assigning unicast resources comprises assigning unicast resources to the first talk group if the number of members of the first talk group is less than the number of members of the talk group having the smallest number of members.

9. The method of claim 1, further comprising:
   determining that there are fewer than a predefined number of group resource requests queued for use of MBMS resources in the second geographical areas and that MBMS resources are not immediately available in the second geographical areas and queuing the group resource request of the first talk group for use of MBMS resources in the second geographical areas for later assignment of the MBMS resources.

10. The method of claim 1, further comprising creating the list of MBMS-eligible talk groups, wherein creating comprises, for each of one or more talk groups considering at least one of:
    a time elapsed since the talk group's most recent activity;
    the second geographical areas within which each user equipment is located;
    a priority of each talk group;
    a network resource utilization data;
    a number of users located within at least one of the second geographical areas and cell affiliated with each talk group;
    a configurable minimum number of members in a talk group within the second geographical areas, below which the talk group is considered ineligible for use of MBMS resources in the second geographical areas;
    a number of simultaneous group calls using MBMS which is supported in each second geographical area;
    a configurable number of talk groups which are allowed to simultaneously be on the MBMS-eligible list for a particular second geographical area; and
    information regarding the failure to establish a unicast resource for user equipment due to radio frequency resource congestion.

11. A controller comprising:
    a memory that is configured to maintain a list of MBMS-eligible talk groups in a first geographical areas;
    a network interface;
    a processor that is configured to:
      access a list of MBMS-eligible talk groups in a first geographical areas;
      receive, via the network interface, a new resource request from a user equipment associated with a first talk group, the new resource request being a request for an assignment of one of MBMS resources and unicast resources for user equipment associated with the first talk group;
      identify a second geographical areas in which members of the first talk group are located;
      determine that MBMS resources are available in the identified second geographical areas;
      determine by reference to the list of MBMS-eligible talk groups, whether the first talk group is an MBMS-eligible talk group in the second geographical areas;
      in response to determining that the first talk group is an MBMS-eligible talk group in the second geographical areas, assign MBMS resources to the first talk group; and
      in response to determining that the first talk group is not an MBMS-eligible talk group in the second geographical areas, assign unicast resources to the first talk group;
    wherein the processor is further configured to create the list of MBMS-eligible talk groups, wherein creating comprises, for each of one or more talk groups:
      identifying each talk group having one or more associated user equipment (UE) located within one or more cells of the first geographical areas to produce one or more identified talk groups and, for each identified talk group:
- determining, for the talk group and for each cell, a talk group size, wherein the talk group size is associated with a number of members of the talk group located in the cell;
- when the talk group size is less than a density threshold, assigning the determined talk group size to a weighted count;
- when the talk group size is greater than the density threshold, calculating the weighted count for the talk group;
- summing the weighted counts for all cells in the first geographical areas; and
- adding the talk group to the list of MBMS-eligible talk groups if the sum of the weighted counts for the talk group is greater than a member threshold, one or more UEs in the talk group have been active within a predefined period of time, and
- limiting the number of talk groups in the list of MBMS-eligible talk groups when the number of talk groups in the list of MBMS-eligible talk groups exceeds an MBMS-eligible threshold.

12. The controller of claim 11, wherein the processor is configured to create the list of MBMS-eligible talk groups, wherein creating comprises, for each of one or more talk groups:
- determining a number of MBMS-capable members of each talk group in each MBSFN in the first geographical areas;
- comparing the number of MBMS-capable members of each talk group in each MBSFN to a member threshold associated with each MBSFN; and
- when the number of MBMS-capable members of a talk group in each MBSFN is less than the member threshold, determining that the talk group is ineligible for MBMS resources.

13. The controller of claim 12, wherein the creating the list of MBMS-eligible talk groups further comprises, for each of the one or more talk groups:
- when the number of MBMS-capable members of the talk group is greater than or equal to the member threshold, determining whether at least one user equipment affiliated with the talk group had been active within a predefined period of time; and
- adding the talk group to the list of MBMS-eligible talk groups.

14. The controller of claim 13, wherein the processor is further configured to limit the number of talk groups in the list of MBMS-eligible talk groups when the number of talk groups in the list of MBMS-eligible talk groups exceeds an MBMS-eligible threshold.

15. The controller of claim 11, wherein the processor is further configured to create the list of MBMS-eligible talk groups, wherein creating comprises, for each of one or more talk group creating the list of MBMS-eligible talk groups and wherein the list of MBMS-eligible talk groups is updated when one or more of a user affiliation event occurs, a user mobility event occurs, or an activity list is updated.

16. The controller of claim 14, wherein the processor is further configured to:
- associate a priority value with each talk group in the list of MBMS-eligible talk groups; and
- rank the talk groups in the list of MBMS-eligible talk groups based on at least one of the priority value associated with each talk group and the number of members of the talk group.

17. The controller of claim 11, wherein the processor is further configured to assign the MBMS resources or the unicast resources by:
- identifying a talk group in the list of MBMS-eligible talk groups having a smallest number of members;
- comparing a number of members of the first talk group with the number of members of the talk group having the smallest number of members;
- wherein the processor is further configured to assign MBMS resources to the first talk group if the number of members of the first talk group is greater than the number of members of the talk group having the smallest number of members; and
- wherein the processor is further configured to assign unicast resources to the first talk group if the number of members of the first talk group is less than the number of members of the talk group having the smallest number of members.

18. The controller of claim 11, wherein the processor is further configured to:
- determine that there are fewer than a predefined number of group resource requests queued for use of MBMS resources in the second geographical areas and that MBMS resources are not immediately available in the second geographical areas and queue the group resource request of the first talk group for use of MBMS resources in the second geographical areas for later assignment of the MBMS resources.

19. The controller of claim 11, wherein the processor is further configured to create the list of MBMS-eligible talk groups, wherein creating comprises, for each of one or more talk groups the processor is configured to consider at least one of:
- a time elapsed since the talk group's most recent activity;
- the second geographical areas within which each user equipment is located;
- a priority of each talk group;
- a network resource utilization data;
- a number of users located within at least one of the second geographical areas and cell affiliated with each talk group;
- a configurable minimum number of members in a talk group within the second geographical areas, below which the talk group is considered ineligible for use of MBMS resources in the second geographical areas;
- a number of simultaneous group calls using MBMS which is supported in each second geographical area;
- a configurable number of talk groups which are allowed to simultaneously be on the MBMS-eligible list for a particular second geographical area; and
- information regarding the failure to establish a unicast resource for user equipment due to radio frequency resource congestion.

* * * * *